United States Patent
Martin

(10) Patent No.: US 12,330,652 B2
(45) Date of Patent: Jun. 17, 2025

(54) LANE-BASED VEHICLE CONTROL

(71) Applicant: Ford Global Technologies, LLC, Dearborn, MI (US)

(72) Inventor: Kevin Martin, Lasalle (CA)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 18/067,752

(22) Filed: Dec. 19, 2022

(65) Prior Publication Data

US 2024/0199024 A1 Jun. 20, 2024

(51) Int. Cl.
| | |
|---|---|
| *B60W 30/18* | (2012.01) |
| *B60W 30/12* | (2020.01) |
| *B60W 30/14* | (2006.01) |
| *B60W 30/16* | (2020.01) |

(52) U.S. Cl.
CPC ...... *B60W 30/18163* (2013.01); *B60W 30/12* (2013.01); *B60W 30/143* (2013.01); *B60W 30/16* (2013.01); *B60W 2554/4041* (2020.02); *B60W 2554/80* (2020.02)

(58) Field of Classification Search
CPC .......... B60W 30/18163; B60W 30/12; B60W 30/143; B60W 30/16; B60W 2554/4041; B60W 2554/80
See application file for complete search history.

(56) References Cited

U.S. PATENT DOCUMENTS

| | | | |
|---|---|---|---|
| 10,981,564 B2 | 4/2021 | Herman et al. | |
| 11,440,563 B2 * | 9/2022 | Kumano | G06V 20/58 |
| 2019/0143971 A1 * | 5/2019 | Makled | B60W 10/20 |
| | | | 701/96 |
| 2019/0278285 A1 * | 9/2019 | Umeda | B60W 30/18154 |
| 2020/0207353 A1 | 7/2020 | Chen et al. | |
| 2020/0398894 A1 * | 12/2020 | Hudecek | G05D 1/0214 |
| 2021/0300412 A1 * | 9/2021 | Dingli | B60W 50/0098 |

OTHER PUBLICATIONS

Morris, B. et al., "Lane Change Intent Prediction for Driver Assistance: On-Road Design and Evaluation," 2011 IEEE Intelligent Vehicles Symposium (IV) Baden-Baden, Germany, Jun. 5-9, 2011, 7 pages.

* cited by examiner

*Primary Examiner* — Joseph J Dallo
(74) *Attorney, Agent, or Firm* — Frank A. MacKenzie; Brooks Kushman P.C.

(57) ABSTRACT

In response to an initiation of a lane-change, a speed of a host vehicle in a current lane can be adjusted to establish a forward longitudinal distance from a lead vehicle in a target lane. The host vehicle is then moved from a first lateral position to a second lateral position in the current lane based on determining that a rear longitudinal distance of the host vehicle from a trailing vehicle in the target lane is less than a rear distance threshold, and then the host vehicle is additionally moved from the second lateral position to a third lateral position in the current lane based on determining that the rear longitudinal distance is increasing. When the forward longitudinal distance exceeds a forward distance threshold and the rear longitudinal distance exceeds the rear distance threshold, the vehicle is moved from the current lane to the target lane.

20 Claims, 10 Drawing Sheets

LANE-BASED VEHICLE CONTROL

BACKGROUND

Vehicles can operate in various autonomous or semi-autonomous modes in which one or more components such as a propulsion, a brake system, and/or a steering system of the vehicle are controlled by a vehicle computer. Various existing systems that can operate vehicle components include systems such as adaptive cruise control, which can control speed of a vehicle in certain situations, including by adapting the speed of the ego vehicle to one or more other vehicles; lane-centering, in which vehicle steering is controlled to maintain a lateral position of a vehicle in the lane of travel; and lane-changing, in which a vehicle steering, acceleration, and/or braking can be controlled to move a vehicle from one lane of travel to another. Such systems may be referred to as Advanced Driver Assistance Systems (ADAS). In some examples, an ADAS system can provide hands-free driving, and can control steering not only to maintain a vehicle in a lane of a roadway, but to change lanes.

DESCRIPTION

Figure 1:
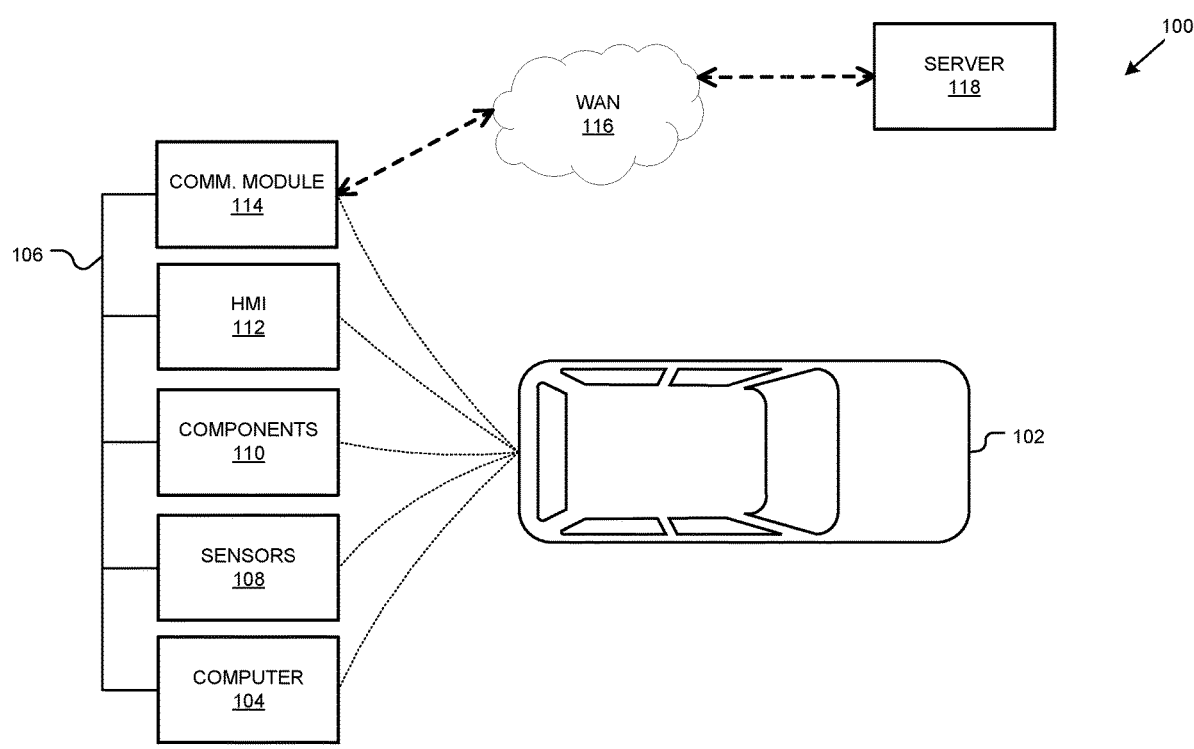
FIG. 1 is a block diagram of an example vehicle system.

A vehicle ADAS, referred to herein as a lane-control ADAS, can be provided to control vehicle steering, including to perform a lane change and/or lane-keeping (or maintenance) operation, without operator intervention or input. A lane change operation may be initiated by a vehicle computer and/or by operator input. In response to an initiation of a lane-change, the computer can adjust a speed of the host vehicle in a current lane to establish a forward longitudinal distance from a lead vehicle in a target lane. That is, the forward longitudinal distance is specified to allow the host vehicle to move to the target lane and assume a position behind the lead vehicle in the target lane. After establishing the forward longitudinal distance, the host vehicle computer can move the host vehicle from a first lateral position to a second lateral position in the current lane. The first lateral position may be a default position such as a center of a current lane and the second lateral position may be a position closer to the target lane. The movement may be performed upon determining that a rear longitudinal distance of the host vehicle from a trailing vehicle in the target lane is less than a rear distance threshold that is specified as a sufficient distance for the host vehicle to move into the target lane in front of the trailing vehicle. Further, if insufficient space remains in a target area in a target lane for the host vehicle to accomplish the lane change, the vehicle computer can additionally move the host vehicle from the second lateral position to a third lateral position in the current lane based on determining that the rear longitudinal distance is increasing. Then, when the forward longitudinal distance exceeds a forward distance threshold and the rear longitudinal distance exceeds the rear distance threshold, move the vehicle from the current lane to the target lane.

A system can comprise a computer for a host vehicle including a processor and a memory, the memory storing instructions executable by the processor such that the computer is programmed to, in response to an initiation of a lane-change, adjust a speed of the host vehicle in a current lane to establish a forward longitudinal distance from a lead vehicle in a target lane; move the host vehicle from a first lateral position to a second lateral position in the current lane based on determining that a rear longitudinal distance of the host vehicle from a trailing vehicle in the target lane is less than a rear distance threshold; move the host vehicle from the second lateral position to a third lateral position in the current lane based on determining that the rear longitudinal distance is increasing; and, when the forward longitudinal distance exceeds a forward distance threshold and the rear longitudinal distance exceeds the rear distance threshold, move the vehicle from the current lane to the target lane.

The instructions can further include instructions to move the host vehicle from the third lateral position to a fourth lateral position in the current lane based on determining that the rear longitudinal distance is increasing while the vehicle is at the third lateral position.

Moving the host vehicle from the second lateral position to the third lateral position in the current lane can be based on determining that the rear longitudinal distance is increasing over a predetermined amount of time after the host vehicle was moved to the second lateral position.

The instructions can further include instructions to cancel the lane-change after a predetermined amount of time has elapsed from the initiation of the lane-change without moving the vehicle from the current lane to the target lane, based on determining that the rear longitudinal distance of the host vehicle is decreasing, and/or based on determining that the forward longitudinal distance cannot be maintained.

The instructions can further include instructions to adjust the forward longitudinal distance such that the rear longitudinal distance exceeds the rear distance threshold. The instructions can further include instructions to maintain the rear longitudinal distance exceeding the rear distance threshold until the forward longitudinal distance exceeds the forward distance threshold. The instructions can further include instructions to cancel the lane-change after a predetermined amount of time has elapsed from adjusting the forward longitudinal distance such that the rear longitudinal distance exceeds the rear distance threshold without the forward longitudinal distance exceeding the forward distance threshold.

The instructions can further include instructions to determine the third lateral position based on adjusting the forward longitudinal distance in addition to determining that the rear longitudinal distance is increasing. The instructions can further include instructions to move the vehicle to a fourth lateral position based on a changed forward longitudinal distance and determining that the rear longitudinal distance continues to exceed the rear distance threshold.

A method comprises, in response to an initiation of a lane-change, adjusting a speed of a host vehicle in a current lane to establish a forward longitudinal distance from a lead vehicle in a target lane; moving the host vehicle from a first lateral position to a second lateral position in the current lane based on determining that a rear longitudinal distance of the host vehicle from a trailing vehicle in the target lane is less than a rear distance threshold; moving the host vehicle from the second lateral position to a third lateral position in the current lane based on determining that the rear longitudinal distance is increasing; and, when the forward longitudinal distance exceeds a forward distance threshold and the rear longitudinal distance exceeds the rear distance threshold, moving the vehicle from the current lane to the target lane.

The method can further comprise moving the host vehicle from the third lateral position to a fourth lateral position in the current lane based on determining that the rear longitudinal distance is increasing while the vehicle is at the third lateral position.

Moving the host vehicle from the second lateral position to the third lateral position in the current lane can be based on determining that the rear longitudinal distance is increasing over a predetermined amount of time after the host vehicle was moved to the second lateral position.

The method can further comprise cancelling the lane-change after a predetermined amount of time has elapsed from the initiation of the lane-change without moving the vehicle from the current lane to the target lane, based on determining that the rear longitudinal distance of the host vehicle is decreasing, and/or based on determining that the forward longitudinal distance cannot be maintained.

The method can further comprise adjusting the forward longitudinal distance such that the rear longitudinal distance exceeds the rear distance threshold. The method can further comprise maintaining the rear longitudinal distance exceeding the rear distance threshold until the forward longitudinal distance exceeds the forward distance threshold. The method can further comprise determining the third lateral position based on adjusting the forward longitudinal distance in addition to determining that the rear longitudinal distance is increasing.

Figure 2:
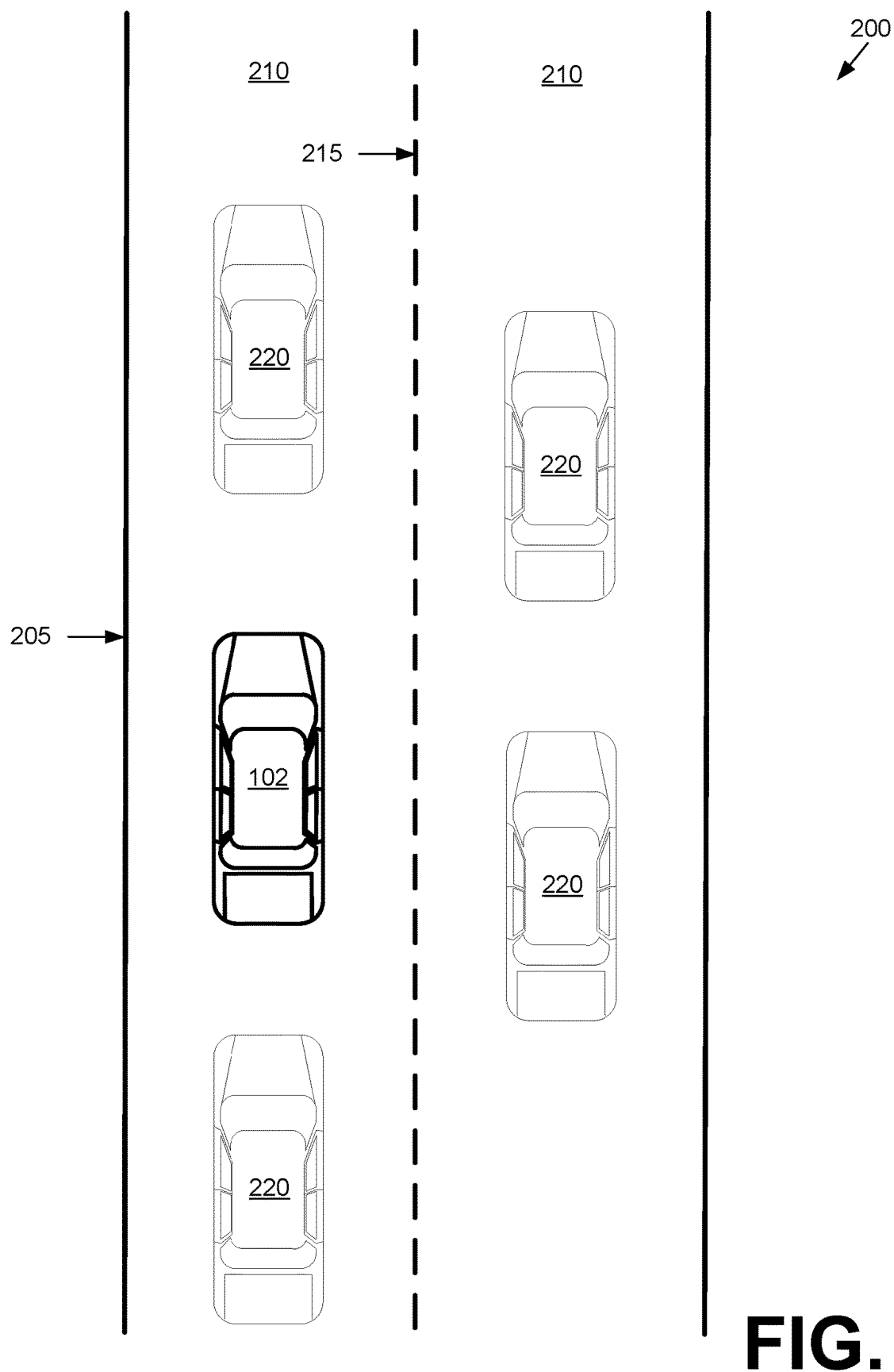
FIGS. 2-9 are respective diagrams illustrating various details of a traffic scene for a lane change.

Referring initially to FIGS. 1 and 2, a vehicle system 100 includes a computer 104 including a processor and a memory. The memory stores instructions executable by the processor such that the computer 104 is programmed to determine that a vehicle 102 is currently operating on a roadway 205 in one of a plurality of available travel lanes 210.

As mentioned above, a vehicle system 100 includes elements that may be provided at least partly to support a lane-control ADAS including a computer 104 that includes a processor and a memory. The memory includes one or more forms of computer 104 readable media, and stores instructions executable by the vehicle computer 104 for performing various operations, including as disclosed herein. For example, a vehicle computer 104 can be a generic computer with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor 108 data and/or communicating the sensor 108 data. In another example, a vehicle computer 104 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components 110 inside an FPGA may be configured based on VHDL programming, e.g. stored in a memory electrically connected to the FPGA circuit. In some examples, a combination of processor(s), ASIC(s), and/or FPGA circuits may be included in a computer 104.

The memory can be of any type, e.g., hard disk drives, solid state drives, servers 118, or any volatile or non-volatile media. The memory can store the collected data sent from the sensors 108. The memory can be a separate device from the computer 104, and the computer 104 can retrieve information stored by the memory via a network in the vehicle 102, e.g., over a CAN bus, a wireless network, etc. Alternatively or additionally, the memory can be part of the computer 104, e.g., as a memory of the computer 104.

The computer 104 may include programming to operate one or more of vehicle 102 brakes, propulsion e.g., control of acceleration in the vehicle 102 by controlling one or more of an internal combustion engine, electric motor, hybrid engine, etc., steering, climate control, interior and/or exterior lights, etc., as well as to determine whether and when the computer 104, as opposed to a human operator, is to control such operations. Additionally, the computer 104 may be programmed to determine whether and when a human operator is to control such operations. The computer 104 may include or be communicatively coupled to, e.g., via a vehicle network 106 such as a communications bus as described further below, more than one processor, e.g., included in components 110 such as sensors 108, electronic control units (ECUs) or the like included in the vehicle 102 for monitoring and/or controlling various vehicle components, e.g., a powertrain controller, a brake controller, a steering controller, etc.

The computer 104 is generally arranged for communications on a vehicle network 106 that can include a communications bus in the vehicle 102 such as a controller area network CAN or the like, and/or other wired and/or wireless mechanisms. The vehicle network 106 is a communications network via which messages can be exchanged between various devices, e.g., sensors 108, components 110, computer 104(s), etc. in vehicle 102. The computer 104 can be generally programmed to send and/or receive, via vehicle network 106, messages to and/or from other devices in vehicle 102 e.g., any or all of ECUs, sensors 108, actuators, components 110, communications module, a human machine interface (HMI), etc. For example, various component 110 subsystems (e.g., components 110 can be controlled by respective ECUs) and/or sensors 108 may provide data to the computer 104 via the vehicle 102 communication network. Further, in cases in which computer 104 actually comprises a plurality of devices, the vehicle network 106 may be used for communications between devices represented as computer 104 in this disclosure. For example, vehicle network 106 can include a controller area network CAN in which messages are conveyed via a CAN bus, or a local interconnect network LIN in which messages are conveyed via a LIN bus. In some implementations, vehicle network 106 can include a network in which messages are conveyed using other wired communication technologies and/or wireless communication technologies e.g., Ethernet, WiFi, Bluetooth, etc. Additional examples of protocols that may be used for communications over vehicle network 106 in some implementations include, without limitation, Media Oriented System Transport MOST, Time-Triggered Protocol TTP, and FlexRay. In some implementations, vehicle network 106 can represent a combination of multiple networks, possibly of different types, that support communications among devices in vehicle 102. For example, vehicle network 106 can include a CAN in which some devices in vehicle 102 communicate via a CAN bus, and a wired or wireless local area network in which some device in vehicle 102 communicate according to Ethernet or Wi-Fi communication protocols.

The vehicle 102 typically includes a variety of sensors 108. A sensor 108 is a device that can obtain one or more measurements of one or more physical phenomena. Some sensors 108 detect internal states of the vehicle 102, for example, wheel speed, wheel orientation, and engine and transmission variables. Some sensors 108 detect the position or orientation of the vehicle 102, for example, global positioning system GPS sensors 108; accelerometers such as piezo-electric or microelectromechanical systems MEMS; gyroscopes such as rate, ring laser, or fiber-optic gyroscopes; inertial measurements units IMU; and magnetometers. Some sensors 108 detect the external world, for example, radar sensors 108, scanning laser range finders, light detection and ranging LIDAR devices, and image processing sensors 108 such as cameras. A LIDAR device detects distances to objects by emitting laser pulses and measuring the time of flight for the pulse to travel to the object and back. Some sensors 108 are communications devices, for example, vehicle-to-infrastructure V2I or vehicle-to-vehicle V2V devices. Often, but not necessarily, a sensor 108 includes a digital-to-analog converter to converted sensed analog data to a digital signal that can be provided to a digital computer 104, e.g., via a network.

Sensors 108 can include a variety of devices, and can be disposed to sense and environment, provide data about a machine, etc., in a variety of ways. For example, a sensor 108 could be mounted to a stationary infrastructure element on, over, or near a road. Moreover, various controllers in a vehicle 102 may operate as sensors 108 to provide data via the vehicle network 106 or bus, e.g., data relating to vehicle 102 speed, acceleration, location, subsystem and/or component 110 status, etc. Further, other sensors 108, in or on a vehicle 102, stationary infrastructure element, etc., infrastructure could include cameras, short range radar, long range radar, LIDAR, and/or ultrasonic transducers, weight sensors 108, accelerometers, motion detectors, etc., i.e., sensors 108 to provide a variety of data. To provide just a few non-limiting examples, sensor 108 data could include data for determining a position of a component 110, a location of an object, a speed of an object, a type of an object, a slope of a roadway 205, a temperature, a presence or amount of moisture, a fuel level, a data rate, etc. In a further example, a location sensor, e.g., a GPS (Global Positioning System) sensor could provide a location of a vehicle 102 which could be compared to a location or locations on a map, e.g., stored in memory of a computer 104 and/or retrieved from a server 118.

The computer 104 may include programming to command one or more actuators to operate one or more vehicle 102 subsystems or components 110, such as vehicle 102 brakes, propulsion, or steering. That is, the computer 104 may actuate control of acceleration in the vehicle 102 by controlling one or more of an internal combustion engine, electric motor, hybrid engine, etc., and/or may actuate control of brakes, steering, climate control, interior and/or exterior lights, etc. The computer 104 may include or be communicatively coupled to, e.g., via a vehicle network 106, more than one processor, e.g., included in components 110 such as sensors 108, electronic control units (ECUs) or the like for monitoring and/or controlling various vehicle components, e.g., ECUs or the like such as a powertrain controller, a brake controller, a steering controller, etc.

The vehicle 102 can include an HMI 112 (human-machine interface), e.g., one or more of a display, a touchscreen display, a microphone, a speaker, etc. The user can provide input to devices such as the computer 104 via the HMI 112. The HMI 112 can communicate with the computer 104 via the vehicle network 106, e.g., the HMI 112 can send a message including the user input provided via a touchscreen, microphone, a camera that captures a gesture, etc., to a computer 104, and/or can display output, e.g., via a screen, speaker, etc.

The computer 104 may be configured for communicating via a vehicle 102 to vehicle 102 communication module 114 or interface with devices outside of the vehicle 102, e.g., through a wide area network 116 and/or vehicle 102 to vehicle 102 V2V, vehicle-to-infrastructure or everything V2X or vehicle-to-everything including cellular communications C-V2X wireless communications cellular, DSRC., etc. to another vehicle 102, to an infrastructure element typically via direct radio frequency communications and/or typically via the network a remote server 118. The module could include one or more mechanisms by which the computers 104 of vehicles 102 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, dedicated short range communications DSRC, cellular V2X CV2X, and the like.

A computer 104 can be programmed to communicate with one or more remote sites such as a remote server 118, via a wide area network 116. The wide area network 116 can include one or more mechanisms by which a vehicle computer 104 may communicate with, for example, a remote server 118. Accordingly, the network can include one or more of various wired or wireless communication mechanisms, including any desired combination of wired e.g., cable and fiber and/or wireless e.g., cellular, wireless, satellite, microwave, and radio frequency communication mechanisms and any desired network topology or topologies when multiple communication mechanisms are utilized. Exemplary communication networks include wireless communication networks e.g., using Bluetooth, Bluetooth Low Energy BLE, IEEE 802.11, vehicle-to-vehicle V2V or vehicle 102 to everything V2X such as cellular V2X CV2X, Dedicated Short Range Communications DSRC, etc., local area networks and/or wide area networks 116, including the Internet, providing data communication services.

The server 118 may include one or more computing devices, e.g., having respective processors and memories and/or associated data stores, that are accessible via the wide area network 116.

FIG. 2 is a diagram of an example traffic scene 200, in which a host vehicle 102 is traveling on a roadway 205 along with other vehicles 220. The vehicles 102, 220 are moving in a same direction in respective travel lanes 210 that are separated by a lane boundary 215 (e.g., a painted or solid line on a roadway 205 can indicate a lane boundary 215). In order for the host vehicle 102 to change lanes 210, various factors must be taken into account, including respective speeds and/or locations of other vehicles 220. Sensors 108 in the host vehicle 102 can provide data that a computer 104 can use to determine a location and/or speed of a second vehicle 220 relative to the host vehicle 102. For example, techniques for determining forward and rear longitudinal distances of other vehicles 220 discussed below, can include obtaining various types of data, such as radar, lidar, camera images, ultrasound data, etc. For example, radar sensors 108 mounted at vehicle 102 corners and/or camera sensors 108 can be used to determine a location and/or speed of another vehicle 220.

Figure 3:
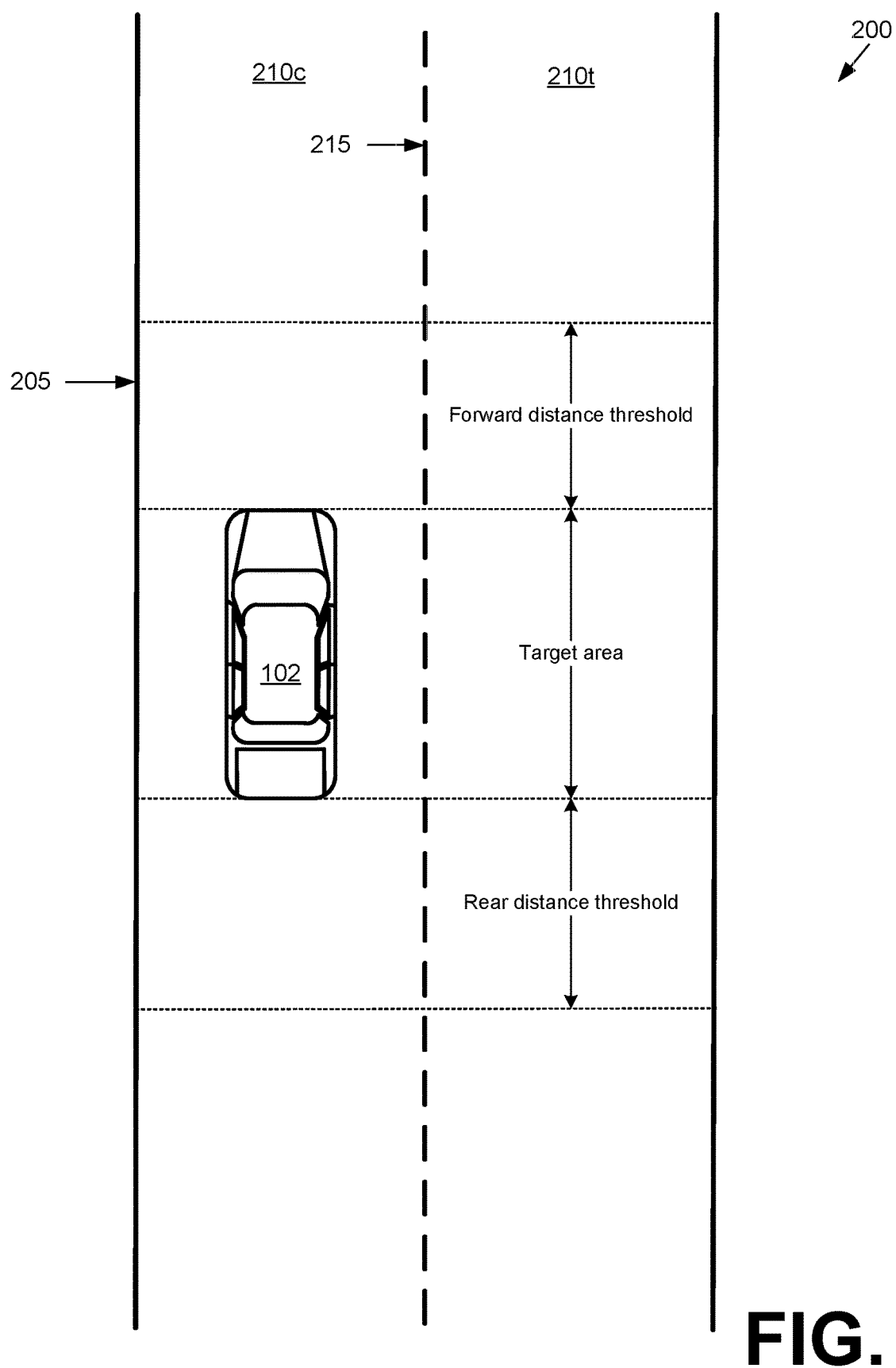

FIG. 3 is a diagram of the example traffic scene 200 in which only the host vehicle 120 is shown to better illustrate certain factors to be considered in lane changes as described herein. As shown in FIG. 3, the host vehicle 102 is in a current travel lane 210c. If a lane change is initiated, e.g., by a vehicle operator actuating a vehicle 102 turn signal, or by a computer 104 operating the vehicle, then the vehicle 102 could move from the current lane 210c to an adjacent target lane 210t. To facilitate the lane change, the vehicle computer 104 could determine a forward distance threshold and a rear distance threshold as minimum forward and rear distances that are to be detected between a target area vehicle 102 in the target lane 210t and other vehicles 220. Forward and rear distances herein mean longitudinal distances, i.e., distances along a roadway 205 in a direction of travel on the roadway 205.

The forward distance threshold and rear distance threshold may be established by an automobile manufacturer, and stored in a memory of the computer 104. For example, empirical testing could be performed by operating vehicles 102, 220 on a test track to determine appropriate forward and rear distance thresholds. Further, the thresholds could be speed-dependent. That is, the computer 104 could store respective forward and rear distance thresholds for respective vehicle 102 speeds or ranges of speeds. For example, empirical testing could determine that the distance thresholds are larger at higher speeds, and lower at lower speeds. Yet further, vehicle 102 speeds could be determined as relative speeds, i.e., relative to other vehicles 220. Forward and rear distance thresholds could be determined based on a speed of the vehicle 102 relative to a ground surface and/or relative to other vehicles 220.

Figure 4:
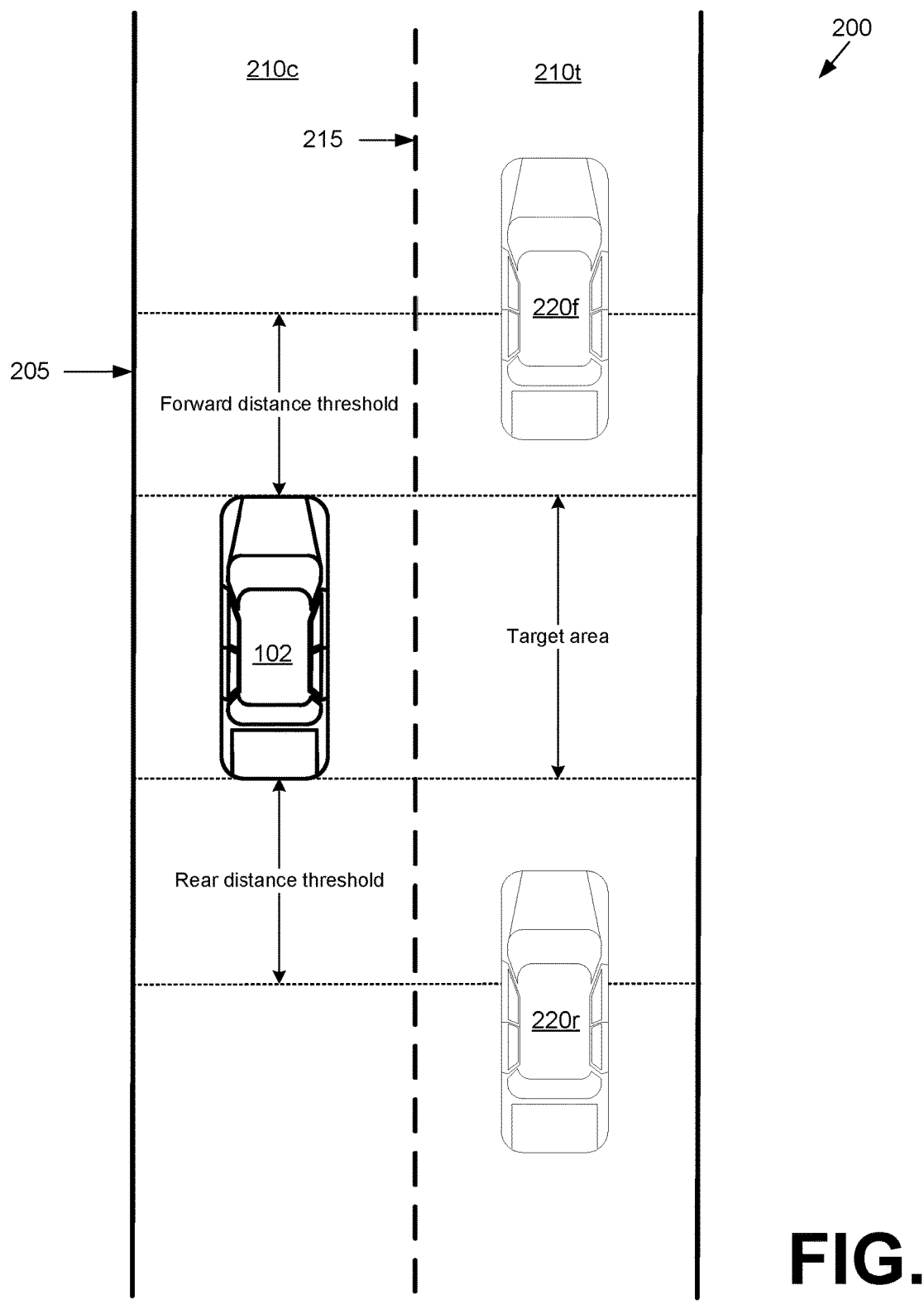
Figure 5:
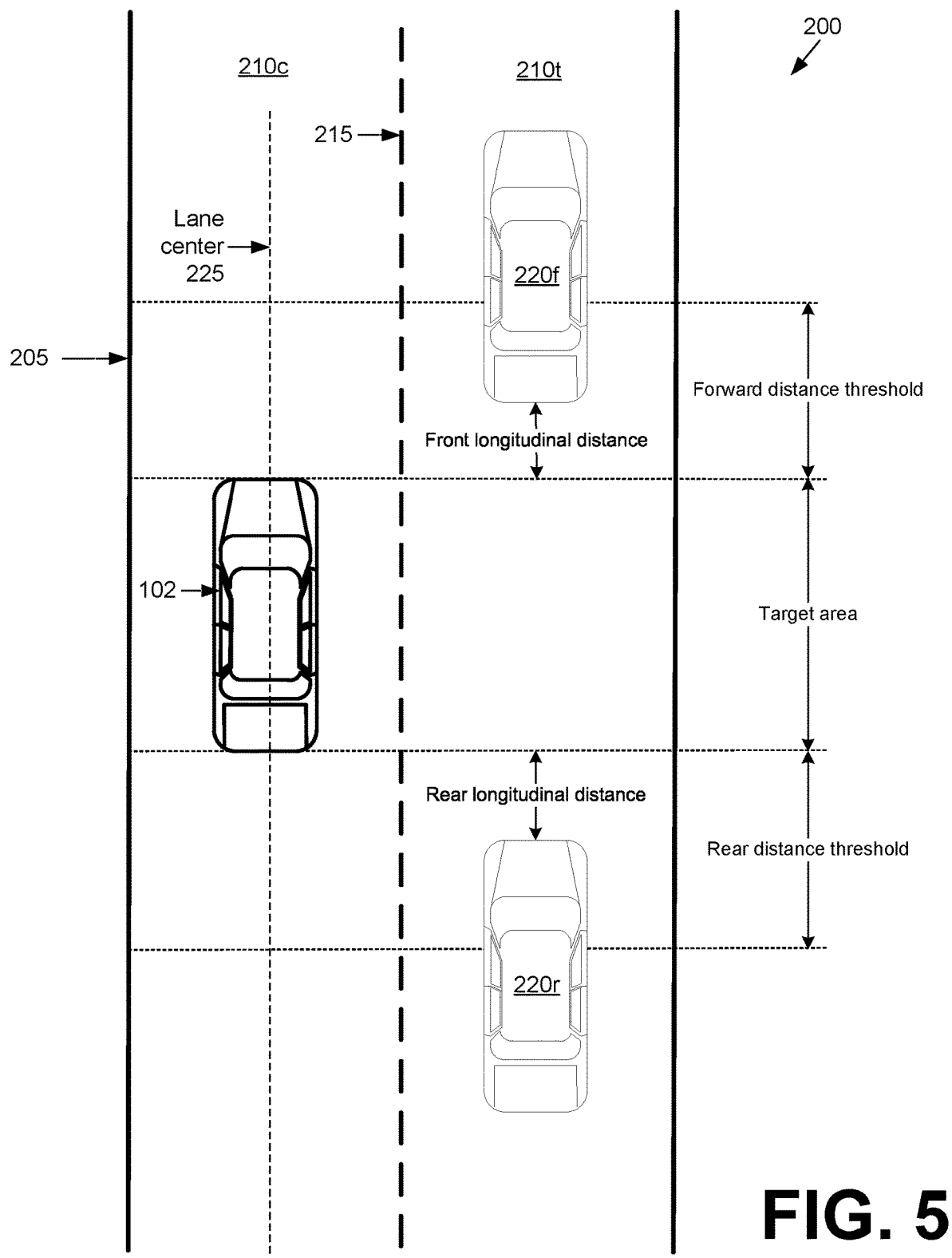

FIG. 4 is a diagram of the example traffic scene 200 of FIG. 3, with vehicles 220r, 220f added in a target lane 210t. As can be seen, a target area for the vehicle 102 to move into the lane 210t is clear, but the vehicles 220r, 220f are violating the rear and front distance thresholds, respectively. FIG. 5 is a diagram of the example traffic scene 200 of FIG. 4, with annotations added to show a rear longitudinal distance of a vehicle 220r from the host vehicle 102, and a front longitudinal distance of a vehicle 220f from the host vehicle 102.

Figure 6:
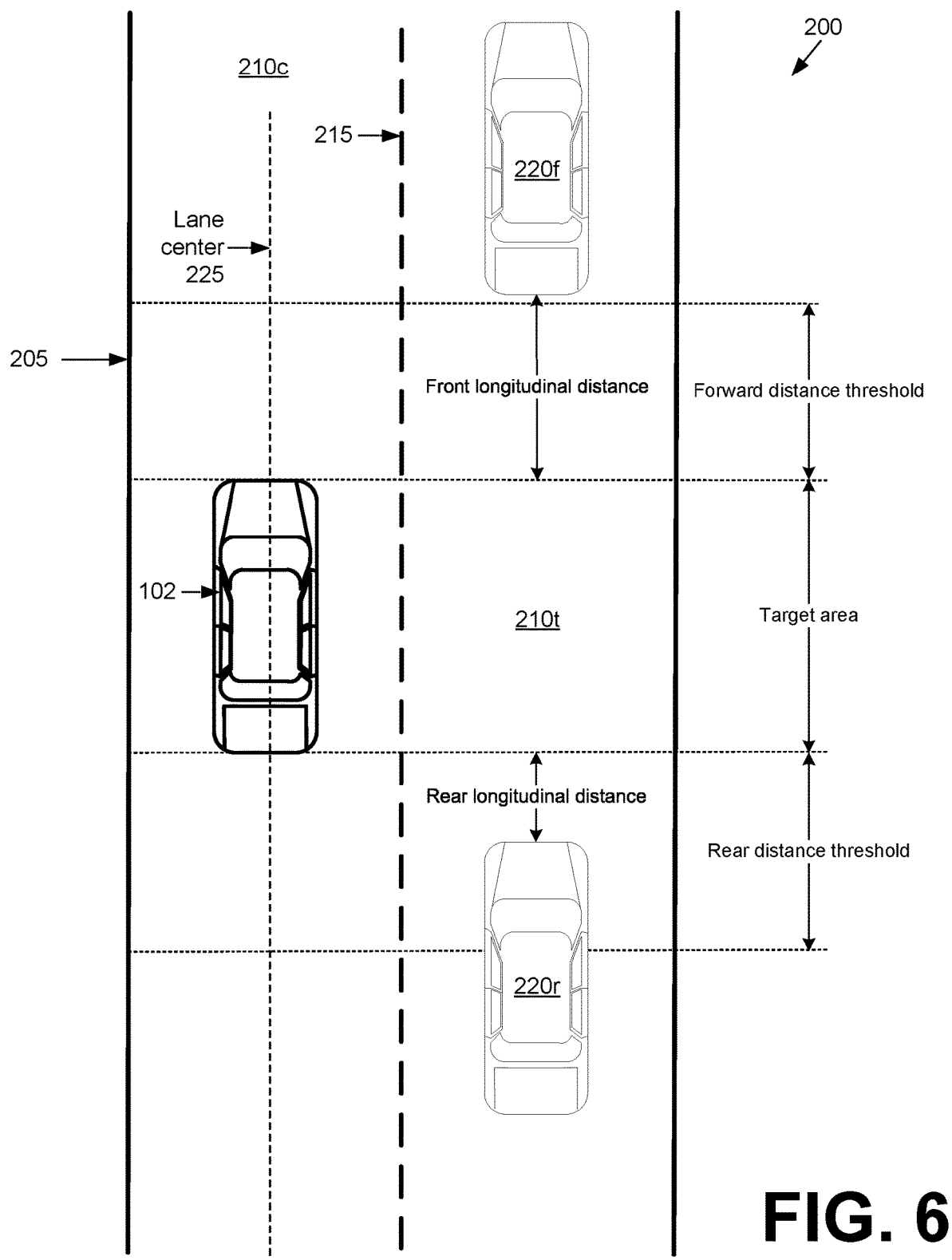

FIG. 6 illustrates the example traffic scene 200 in which a host vehicle 102 has adjusted its speed based on a detected speed of another vehicle 220f to maintain a front longitudinal distance between the vehicles 102, 220f that is at or exceeds a forward distance threshold. That is, a computer 104 can be programmed to, in response to an initiation of a lane-change, adjust a speed of the host vehicle 102 in a current lane to establish a forward longitudinal distance from a lead vehicle in a target lane. However, it can also be seen that the rear longitudinal distance between the host vehicle 102 and a rear vehicle 220r is less than the rear distance threshold. Accordingly, the vehicle 102 can make lateral adjustments as described with respect to FIGS. 7 and 8 to facilitate a lane change.

Figure 7:
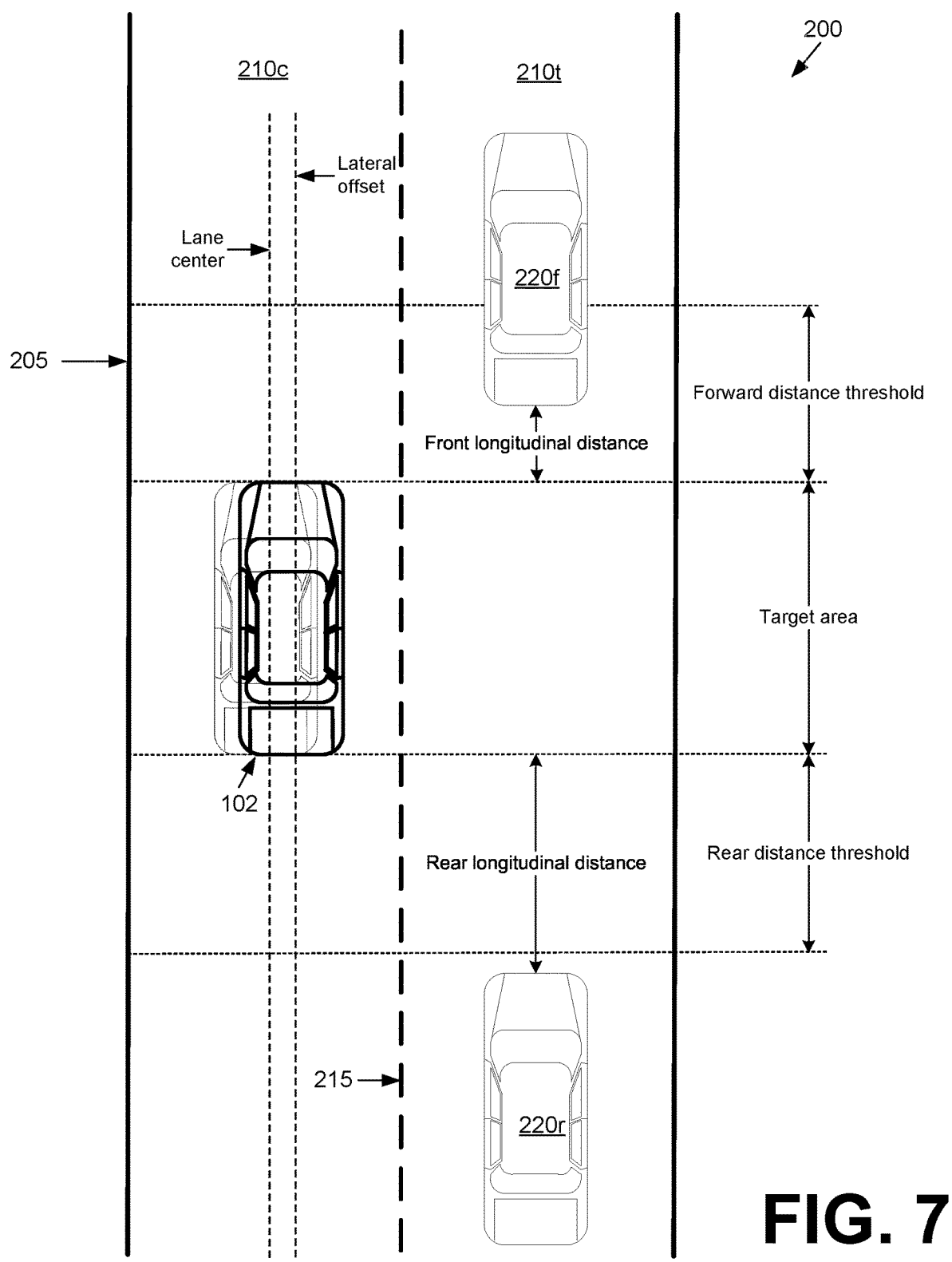

FIG. 7 illustrates further details of the example traffic scene 200, including showing the vehicle 102 changing its lateral position in a lane 210c. That is, a computer 104 can be programmed to move the host vehicle 102 from a first lateral position to a second lateral position in a current lane 210c based on determining that a rear longitudinal distance of the host vehicle 102 from a trailing vehicle 220r in the target lane is less than a rear distance threshold. Typically a vehicle 102 may operate in a default position in a lane 210, such as by following a line defined by a lane center. In operations described herein, a computer 104 may be programmed to adjust a lateral position of the vehicle 102 in a current lane 210 according to a specified lateral offset. A lateral position in a lane 210 herein means a position of a vehicle 102 along a line perpendicular to a line defining the lane 210 center. The vehicle 102 is shown at a first lateral offset from the lane center in FIG. 7, with the dotted lines representing a former position of the vehicle 102 operating along the lane center.

The distance of the lateral offsets may be determined by a vehicle manufacturer and stored in a memory of the computer 104. For example, distances for lateral offsets may be determined according to empirical testing by operating a vehicle 102 with other vehicles 222 determine lateral offsets effective for facilitating lane change operations. Further, lateral offsets may be limited according to practical concerns, e.g., a computer 104 could be limited from applying a lateral offset that would bring a vehicle 102 within a predetermined lateral distance of a lane boundary 215. Lateral offsets could alternatively or additionally be based on a width of a lane 210, e.g., a lateral offsets could be a percentage of a lane 210 with, or could be a specified distance from a lane 215 boundary.

As also illustrated in FIG. 7, the computer 104 can include programming to adjust the forward longitudinal distance between the host vehicle 102 and the forward vehicle 220f such that the rear longitudinal distance between the host vehicle 102 and the rear vehicle 220r exceeds the rear distance threshold. Typically this is done in a situation such as illustrated in FIGS. 4 and 5, in which a target area for a lane change between vehicles 220f, 220r in a target lane 210t may be clear, but the rear and/or forward distance thresholds are not satisfied. That is, as seen in FIGS. 4 and 5, the host vehicle 102 is within the respective thresholds of the vehicles 220f, 220r. Then, the computer 104 can execute programming to maintain the rear longitudinal distance exceeding the rear distance threshold until the forward longitudinal distance exceeds the forward distance threshold, i.e., the vehicle 102 can maintain the rear longitudinal distance exceeding the rear distance threshold while a forward vehicle 220f adjust its speed to allow the host vehicle 102 to execute the lane change based on the forward distance threshold as well as the rear distance threshold being met.

Figure 8:
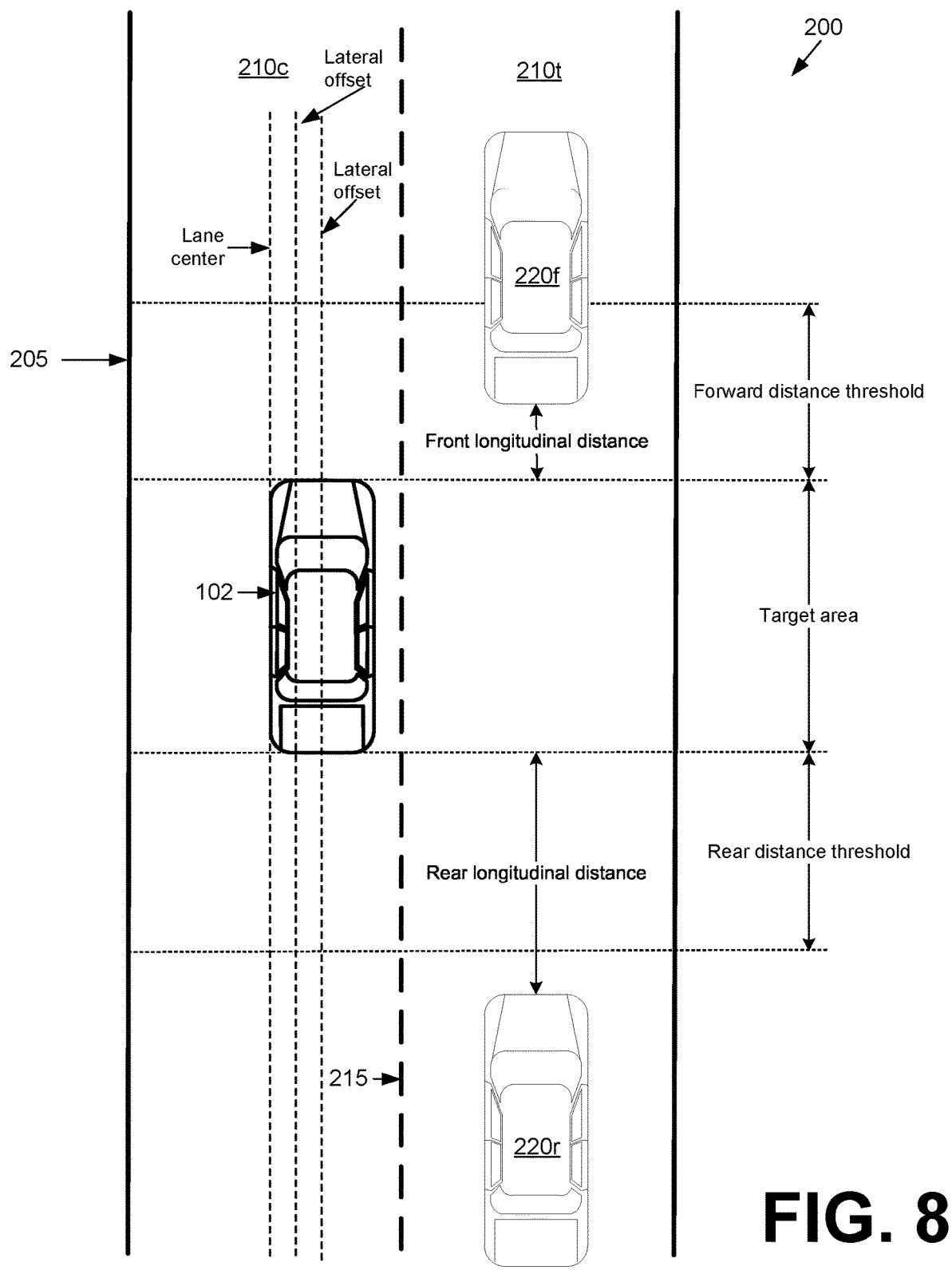

FIG. 8 illustrates the possibility of a plurality of lateral offsets, within the vehicle 102 being shown in FIG. 8 operating at a second lateral offset in a lane 210c closer to the target lane 210t than a first lateral offset in the lane 210c. (The dotted-line vehicle is not shown in FIG. 8 to avoid a needlessly complicated illustration.) Moving the vehicle 102 according to lateral offsets with any current lane 210c can communicate, e.g., in addition to turn signal lights, etc., to vehicles 220 in a target lane 210t that the host vehicle 102 desires a lane change. For example, a computer 104 can be programmed to move the host vehicle 102 from the second lateral position to a third lateral position in the current lane 210c based on determining that the rear longitudinal distance is increasing. To determine that a rear longitudinal distance is increasing, a computer 104 could measure the rear longitudinal distance at a plurality of times, e.g., could sample the distance at respective one-second intervals over a span of five seconds and determine whether the rear longitudinal distance has increased over that time span. The time span could be measured from a time at which or after the host vehicle 102 was moved to the second lateral position.

Moreover, the computer 104 could include programming to determine the third lateral position based on adjusting the forward longitudinal distance in addition to determining that the rear longitudinal distance is increasing.

Yet further, as mentioned above, additional lateral positions are possible. A computer 104 could further include programming to move the host vehicle 102 from the third lateral position one or more additional lateral positions such as a fourth lateral position in the current lane 210c based on determining that the rear longitudinal distance is increasing while the vehicle 102 is at the third lateral position. For example, the computer 104 could be programmed to move the vehicle 102 to a fourth lateral position based on a changed forward longitudinal distance and determining that the rear longitudinal distance continues to exceed the rear distance threshold. Moving the vehicle 102 to a further, e.g. fourth, lateral position could further encourage a forward vehicle 220f to change a longitudinal position to allow the vehicle 102 to change lanes.

Figure 9:
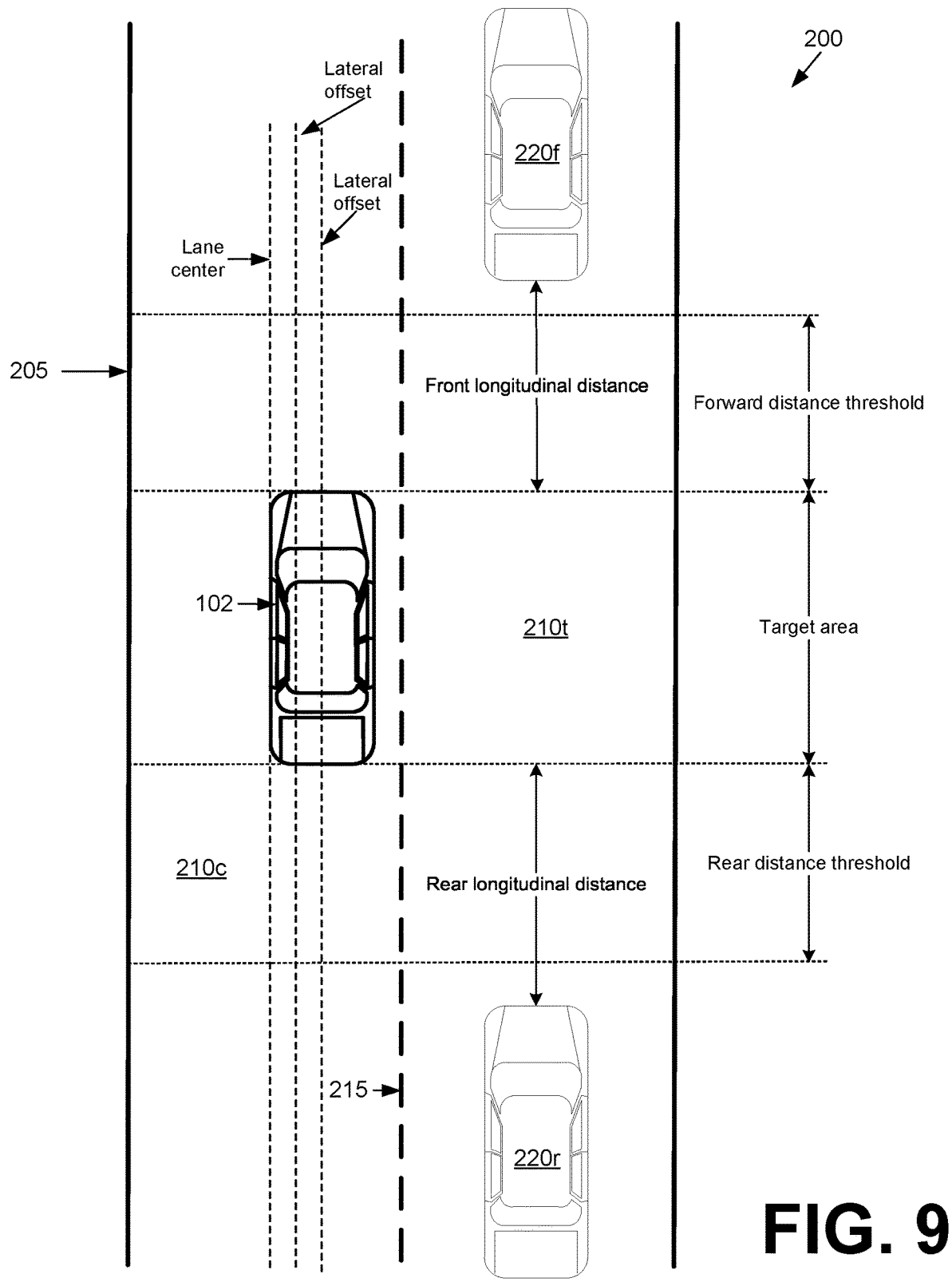

After the vehicle 102 has been moved to at least one lateral position from a default (e.g., lane center) lateral position, when the forward longitudinal distance exceeds a forward distance threshold and the rear longitudinal distance exceeds the rear distance threshold, the computer 104 could execute programming to move the vehicle 102 from the current lane 210c to the target lane 210t, e.g., could actuate components such as steering, propulsion, and/or breaking for the vehicle to follow a path into a target area in the target lane 210t. FIG. 9 illustrates the example traffic scene 200 with rear and forward distance thresholds being exceeded by rear and front longitudinal distances, respectively. Under this condition, the vehicle 102 can move into a target area of the target lane 210t, i.e., can execute a lane change.

However, there may be situations where conditions for a lane change are not met within a reasonable period of time. For example, a vehicle 102 may execute maneuvers as described above, but one or both of the forward or rear distance thresholds or some other condition for a lane change are not satisfied within an amount of time stored in a memory of the computer 104. Other examples of conditions that could be a reason to cancel a lane change are a determination that the rear longitudinal distance of the host vehicle is decreasing or a determination that the forward longitudinal distance cannot be maintained, e.g., because a forward vehicle 220f and/or a rear vehicle 220r are varying their speeds and/or locations. In these situations, a computer 104 can include programming to cancel a lane change operation, e.g., to cancel the lane-change after a predetermined amount of time has elapsed from the initiation of the lane-change without moving the vehicle 102 from the current lane 210c to the target lane 210t.

In some situations, a time to determine whether to cancel a lane change operation can be a predetermined amount of time that has elapsed from adjusting the forward longitudinal distance such that the rear longitudinal distance exceeds the rear distance threshold without the forward longitudinal distance exceeding the forward distance threshold. That is, as explained above, the vehicle computer 104 can execute programming to maintain a rear distance threshold and can then monitor the front longitudinal distance, and can change lanes if the front longitudinal distance exceeds the forward distance threshold. However, if the forward distance threshold is not satisfied within the predetermined time, the lane change operation can be canceled.

Figure 10:
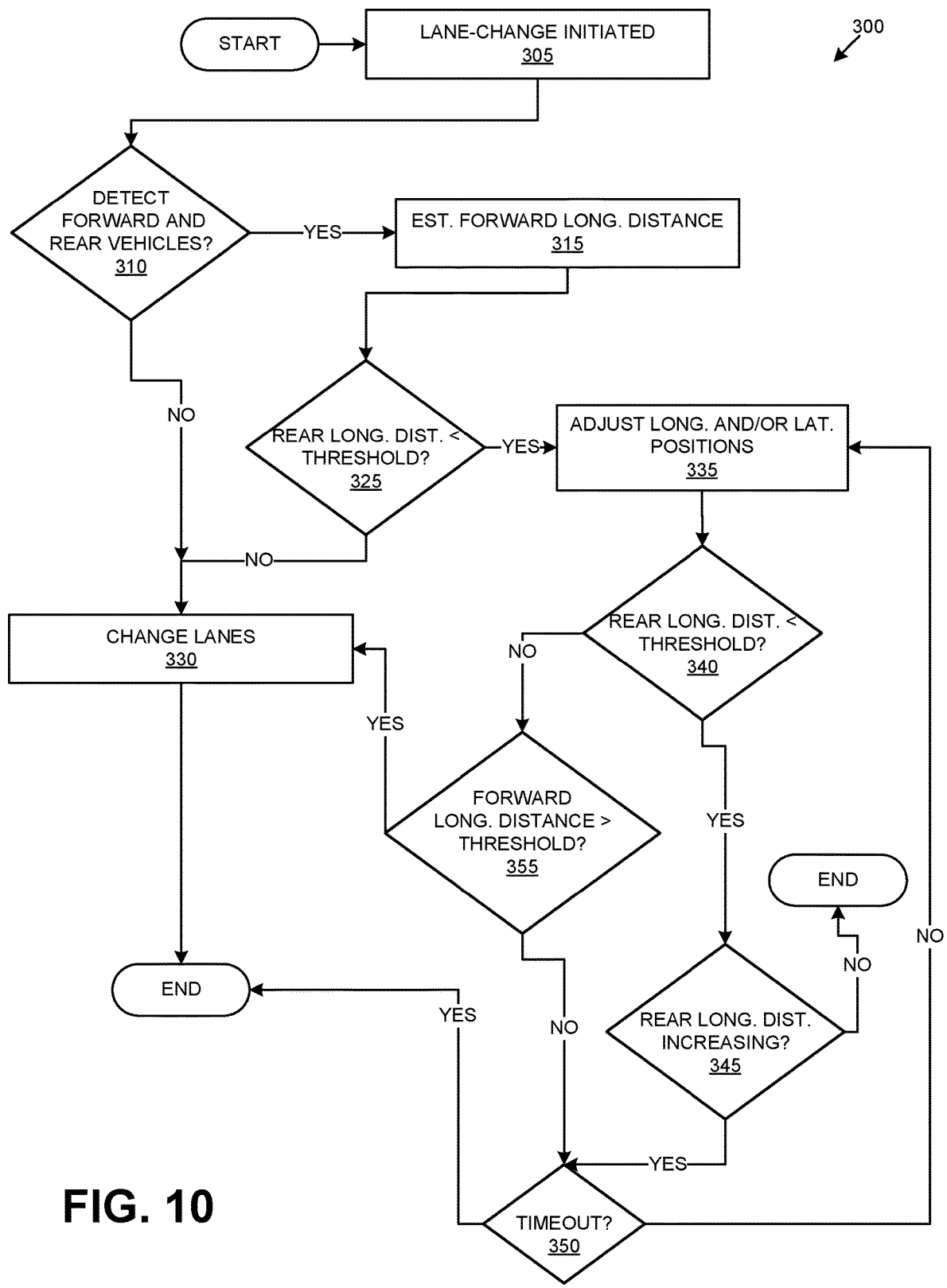
FIG. 10 illustrates an example process for a lane change operation.

FIG. 10 illustrates an example process 300 for a lane change operation from a current lane 210c to a target lane 210c.

The process 300 begins in a block 305, in which the lane change operation is initiated in a computer 104 and a host vehicle 102. For example, a user input such as a selection on a vehicle HMI, input via a turn signal stalk, etc., could indicate that a lane change operation is to be initiated, and, e.g., in situations where more than one target lane 210t is possible, could further indicate a target lane 210t.

Next, and a block 310, the computer 104 determines whether forward and rear target vehicles 220f, 220r are detected the target lane 210t. A forward vehicle 220f means a vehicle in the target lane 210t that is closest to and forward of a predetermined longitudinal position on the host vehicle 102, e.g., a lateral center line that divides a longitudinal extent of the vehicle 102, a front edge of the vehicle 102, or some other predetermined longitudinal position or reference point on the vehicle 102. A rear vehicle 220r means a vehicle in the target lane 210t that is closest to and rear of a predetermined longitudinal position on the host vehicle 102, e.g., the lateral center line that divides a longitudinal extent of the vehicle 102, a rear edge of the vehicle 102, or some other predetermined longitudinal position or reference point on the vehicle 102. Other vehicles 220 generally may be identified by a computer 100 for the host vehicle 102 based on a predetermined range, e.g., based on a range of vehicle 102 sensors 108. If vehicles 220 are not detected, the process 300 can proceed to a block 330. Otherwise, the process 300 proceeds to a block 315.

In the block 315, the computer 104, e.g., based on detecting a speed and location of a forward vehicle 220f as described above, adjusts vehicle 102 speed to establish a forward longitudinal distance according to the forward longitudinal distance threshold between the vehicle 102 in a current lane 210t and the forward (or leading) vehicle 220f in the target lane 210t.

Next, in a decision block 325, the computer 104 determines whether a rear longitudinal distance between the host vehicle 102 and a rear vehicle 220r is below the rear distance threshold. If not, then a sufficient target area between the forward and rear vehicles 220 is already provided, and the process 300 proceeds to a block 330. Otherwise, the process 300 proceeds to the block 335.

In the block 330, the vehicle computer 104 executes a lane change operation according to any suitable technique for moving the vehicle 102 may current lane 210c to a target area in a target lane 210t. Following the block 320, the process 300 can end.

In the block 335, the vehicle computer 104 adjust one or both of a longitudinal or a lateral position of the host vehicle 102 with respect to leading and/or trailing vehicles 220f, 220r.

In the block 335, the computer 104 can adjust one or more positions of the vehicle 102 in the current lane 210c. For example, as explained above, the vehicle 102 can be positioned longitudinally such that the forward distance threshold is not satisfied, but so that the rear distance threshold is satisfied. Further, the vehicle 102 can be laterally positioned to move laterally in a direction of a target lane 210t from a default (e.g., lane center) lateral position in a current lane 210c.

Following the block 335, in a decision block 340, the computer 104 determines whether a rear longitudinal distance threshold is now satisfied, i.e., whether the rear longitudinal distance is now less than the threshold. As mentioned above, the computer 104 may monitor a distance over time, e.g., three or five seconds, to determine whether a distance threshold is satisfied. If the rear longitudinal distance remains below the rear longitudinal distance threshold, then a block 345 is executed next. Otherwise, a block 355 is executed next.

In the block 345, the computer 104 determines whether the rear longitudinal distance is increasing. For example, the computer 104 can monitor the rear longitudinal distance over a period of time, and can compare the first detected longitudinal distance at a first time to a second detected longitudinal rear distance at a second time, and can determine that the distance is increasing if the second distance is greater than the first. If the rear longitudinal distance is not increasing, then the process 300 may hand. If the rear longitudinal distance is increasing, then process 300 can proceed to a block 350.

In the block 350, the computer 104 can determine whether a timeout period has been exceeded. That is, a specified amount of time, e.g., 30 seconds, 60 seconds, etc., could be specified for a lane change operation to be conducted after the lane change operation is initiated, e.g., as described above with respect to the block 305. If the computer 104 is unable to execute the lane change operation within the timeout period, then the process 300 may end. However, if the process 300 is within the timeout period, then the process 300 may return to the block 335, wherein longitudinal and/or lateral positions may be adjusted as described above.

Computer executable instructions may be compiled or interpreted from computer programs created using a variety of programming languages and/or technologies, including, without limitation, and either alone or in combination, Java, C, C. Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The term exemplary is used herein in the sense of signifying an example, e.g., a reference to an exemplary widget should be read as simply referring to an example of a widget.

Use of in response to, based on, and upon determining herein indicates a causal relationship, not merely a temporal relationship. For example, the statement "A is based on B" means that A not only follows B and time, but is a result at least in part of B. Further, unless explicitly stated otherwise, "based on" includes partly based on in addition to completely based on. Put another way, "based on," unless explicitly stated otherwise, means "based at least in part on."

The invention claimed is:

1. A system comprising a computer for a host vehicle including a processor and a memory, the memory storing instructions executable by the processor such that the computer is programmed to:
   in response to an initiation of a lane-change, adjust a speed of the host vehicle in a current lane to establish a forward longitudinal distance from a lead vehicle in a target lane;
   move the host vehicle from a first lateral position to a second lateral position in the current lane based on determining that a rear longitudinal distance of the host vehicle from a trailing vehicle in the target lane is less than a rear distance threshold;
   move the host vehicle from the second lateral position to a third lateral position in the current lane based on determining that the rear longitudinal distance is increasing; and
   when the forward longitudinal distance exceeds a forward distance threshold and the rear longitudinal distance exceeds the rear distance threshold, move the vehicle from the current lane to the target lane.

2. The system of claim 1, wherein the instructions further include instructions to move the host vehicle from the third lateral position to a fourth lateral position in the current lane based on determining that the rear longitudinal distance is increasing while the vehicle is at the third lateral position.

3. The system of claim 1, wherein moving the host vehicle from the second lateral position to the third lateral position in the current lane is based on determining that the rear longitudinal distance is increasing over a predetermined amount of time after the host vehicle was moved to the second lateral position.

4. The system of claim 1, wherein the instructions further include instructions to cancel the lane-change after a predetermined amount of time has elapsed from the initiation of the lane-change without moving the vehicle from the current lane to the target lane.

5. The system of claim 1, wherein the instructions further include instructions to cancel the lane-change based on determining that the rear longitudinal distance of the host vehicle is decreasing.

6. The system of claim 1, wherein the instructions further include instructions to cancel the lane-change based on determining that the forward longitudinal distance cannot be maintained.

7. The system of claim 1, wherein the instructions further include instructions to adjust the forward longitudinal distance such that the rear longitudinal distance exceeds the rear distance threshold.

8. The system of claim 7, wherein the instructions further include instructions to maintain the rear longitudinal distance exceeding the rear distance threshold until the forward longitudinal distance exceeds the forward distance threshold.

9. The system of claim 8, wherein the instructions further include instructions to cancel the lane-change after a predetermined amount of time has elapsed from adjusting the forward longitudinal distance such that the rear longitudinal distance exceeds the rear distance threshold without the forward longitudinal distance exceeding the forward distance threshold.

10. The system of claim 7, wherein the instructions further include instructions to determine the third lateral position based on adjusting the forward longitudinal distance in addition to determining that the rear longitudinal distance is increasing.

11. The system of claim 10, wherein the instructions further include instructions to move the vehicle to a fourth lateral position based on a changed forward longitudinal distance and determining that the rear longitudinal distance continues to exceed the rear distance threshold.

12. A method, comprising:
   in response to an initiation of a lane-change, adjusting a speed of a host vehicle in a current lane to establish a forward longitudinal distance from a lead vehicle in a target lane;
   moving the host vehicle from a first lateral position to a second lateral position in the current lane based on determining that a rear longitudinal distance of the host vehicle from a trailing vehicle in the target lane is less than a rear distance threshold;
   moving the host vehicle from the second lateral position to a third lateral position in the current lane based on determining that the rear longitudinal distance is increasing; and
   when the forward longitudinal distance exceeds a forward distance threshold and the rear longitudinal distance exceeds the rear distance threshold, moving the vehicle from the current lane to the target lane.

13. The method of claim 12, further comprising moving the host vehicle from the third lateral position to a fourth lateral position in the current lane based on determining that the rear longitudinal distance is increasing while the vehicle is at the third lateral position.

14. The method of claim 12, wherein moving the host vehicle from the second lateral position to the third lateral position in the current lane is based on determining that the rear longitudinal distance is increasing over a predetermined amount of time after the host vehicle was moved to the second lateral position.

15. The method of claim 12, further comprising cancelling the lane-change after a predetermined amount of time has elapsed from the initiation of the lane-change without moving the vehicle from the current lane to the target lane.

16. The method of claim 12, further comprising cancelling the lane-change based on determining that the rear longitudinal distance of the host vehicle is decreasing.

17. The method of claim 12, further comprising cancelling the lane-change based on determining that the forward longitudinal distance cannot be maintained.

18. The method of claim 12, further comprising adjusting the forward longitudinal distance such that the rear longitudinal distance exceeds the rear distance threshold.

19. The method of claim 18, further comprising maintaining the rear longitudinal distance exceeding the rear distance threshold until the forward longitudinal distance exceeds the forward distance threshold.

20. The method of claim 18, further comprising determining the third lateral position based on adjusting the forward longitudinal distance in addition to determining that the rear longitudinal distance is increasing.

* * * * *